United States Patent [19]

Kikuchi et al.

[11] 4,128,695

[45] Dec. 5, 1978

[54] COATED STYRENIC RESIN PLATE FOR INK-ACCEPTABILITY AND PAINTABILITY

[75] Inventors: Katsuro Kikuchi, Yokohama; Shohachi Masai, Kashiwa; Tsugane Tanaka, Musashino, all of Japan

[73] Assignees: Asahi-Dow Limited; Koyo Sangyo Co., Ltd., both of Tokyo, Japan

[21] Appl. No.: 885,391

[22] Filed: Mar. 10, 1978

Related U.S. Application Data

[63] Continuation-in-part of Ser. No. 683,082, May 4, 1976, abandoned.

[30] Foreign Application Priority Data

May 10, 1975 [JP] Japan ................................. 50-55237
Apr. 19, 1976 [JP] Japan ................................. 51-44269

[51] Int. Cl.² .......................... B32B 27/40; B32B 3/26
[52] U.S. Cl. ................................. 428/423; 427/385 B; 428/315
[58] Field of Search ............... 428/310, 315, 320, 321, 428/411, 423, 425; 427/385 B

[56] References Cited

U.S. PATENT DOCUMENTS

| | | | |
|---|---|---|---|
| 3,598,642 | 8/1971 | Huang et al. | 428/315 |
| 3,796,593 | 3/1974 | Finelli et al. | 427/385 B |
| 3,969,569 | 7/1976 | Vasta | 428/423 |

*Primary Examiner*—William J. Van Balen
*Attorney, Agent, or Firm*—Flynn & Frishauf

[57] ABSTRACT

A styrenic resin plate excellent in ink-acceptability and paintability is manufactured by applying an emulsion coating comprising a hydrophobic synthetic resin, a hydrophilic polymer, a finely pulverized inorganic filler and water or an emulsion coating obtained by adding to a mixture of said components a solution of an isocyanate compound possessed of at least two functionalities in a hydrophobic solvent to one side or both sides of a styrenic resin plate, preferably a foamed plate of styrenic resin, uniformly by means of a roll coater, a spray coater or the like and drying the applied coat of emulsion coating to form a surface layer on said resin plate. The present styrenic resin plate excellent in ink-acceptability, paintability is used as displays, advertizing boards, etc.

8 Claims, No Drawings

COATED STYRENIC RESIN PLATE FOR INK-ACCEPTABILITY AND PAINTABILITY

This application is a continuation-in-part application of application Ser. No. 683,082, filed May 4, 1976, now abandoned.

This invention relates to a styrenic resin plate excellent in ink-acceptability and paintability and a method for preparation thereof.

Foamed plates of styrenic resin are light, easy to cut and possess in strength enough for use as display panels. Thus, they find utility as displays, advertising boards and boards for posters, and the like. The styrenic resin, however, offers poor resistance to solvents. When a solvent type paint is applied to form a coat thereon or letters and figures are drawn thereon with such solvent type paint, the surface thereof is corroded by the paint, rendering it impossible to obtain the desired effects of coating or drawing. When a coat is formed thereon or letters and figures are drawn thereon with an aqueous paint, the paint generally does not spread evenly on the surface, giving rise to runaway and uneven painting. If the paint does spread to a certain degree on the surface, it still suffers from poor adhesion. As a result, the coat formed or the letters and figures drawn on the surface all readily peel off. It has thus been impossible to obtain styrenic resin plates which have a coat or letters and figures held fast on their surface for a long time. There are also known light-weight displays which are formed by lamination of sheets of paper. They are not suitable for the purpose of display, for they have a high susceptibility to warping owing to its delicate response to exchanges of ambient humidity, flammability and other similar disadvantages. Foundation pads formed by lamination of synthetic resin film sheets are also known. When an aqueous paint is used thereon, however, these pads have disadvantages such as runaway and uneven painting and the paint so applied is not held fast to the surface for a long time. Further when the duration of display is long, the paint applied to the surface tends to form cracks or peel off because of deficiency of affinity for the synthetic resin film in the lamination. Thus, such foundation pads have failed to bring about sufficient effects of display.

It is an object of the present invention to provide a styrenic resin plate, particularly a foamed plate of styrenic resin, which excels in durability, flame-retardancy, ink-acceptability and paintability and yet avoids disadvantages such as runaway of applied paint, uneven painting, surface corrosion by paint, warping of resin plate and formation of cracks in applied paint which, in the prior art, have been suffered with the use of both aqueous paints and solvent type paints.

SUMMARY OF THE INVENTION

According to the present invention, there is provided a styrenic resin plate excellent in ink-acceptability and paintability, comprising a styrenic resin substrate having coated on one surface or both surfaces thereof a layer with a composition comprising 100 parts by weight of a resin mixture consisting of 60 to 95% by weight of a hydrophobic synthetic resin and 40 to 5% by weight of a hydrophilic synthetic resin, 30 to 500 parts by weight of a finely pulverized inorganic filler and 2 to 15 parts by weight of an isocyanate compound having at least two isocyanate groups. The styrenic resin plate excellent in ink-acceptability and paintability of the present invention can be produced by a method, which comprises applying uniformly to one surface or both surfaces of a styrenic resin plate, preferably a foamed plate of styrenic resin, an emulsion coating obtained by adding to a mixture comprising a hydrophobic synthetic resin, a hydrophobic polymer, a finely pulverized filler and water, a solution of an isocyanate compound having at least two isocyanate groups in a hydrophobic solvent and thereafter drying the applied emulsion coating for thereby forming a surface layer on said resin plate. In the method described above, it is permissible to add a coloring agent, a flame-retardant, a light stabilizer, a dispersant, etc. to said emulsion coating.

In the present invention, the hydrophobic synthetic resin in the mulsion coating functions as a binder for fast union of the finely pulverized inorganic filler, pigment and other additives and it also serves as vehicle capable of enabling the mixture of the components of emulsion coating, while being blended, to withstand mechanical stress, permitting the resultant emulsion coating to be stabilized without gelation and to suit the work of application such as with a roll coater and causing the applied emulsion coating to form a surface layer which is sufficiently tenacious and yet possesses flexibility enough to preclude possible formation of cracks due to exposure to outdoor conditions.

The hydrophobic synthetic resins which are usable in the present invention include butadiene resin, acrylic resins, vinylidene chloride resins, ethylenic resins, and vinyl acetate resins. Of these, vinyl acetate resins, acrylic resins and butadiene resins prove to be more desirable, vinyl acetate resins being preferable over the others.

The hydrophobic synthetic resins enumerated above are generally obtained less expensively in the form of emulsion than in the form of solids. For the purpose of the present invention, they are desired to be used in their original form of emulsion.

The butadiene resins which are usable in the present invention include polymers of butadiene compounds e.g. chloroprene, butadiene-1,3 2-methyl-butadiene-1,3 (isoprene), 2,3-dimethylbutadiene-1,3 and piperidine and copolymers thereof as well as copolymers formed between at least one of said butadiene compounds and at least one other polymerizable compound which, upon copolymerization with said butadiene compound, produces a rubbery copolymer. Examples of such other polymerizable compounds which are capable of being copolymerized with said butadiene compound to produce a rubbery copolymer include monoethylenic compounds containing a $CH_2=C$ group such as allyl olefins embracing styrene, vinyl toluene, $\alpha$-methylstyrene, chlorostyrene, dichlorostyrene, and vinyl naphthalene-$\alpha$; methylene carboxylic acid and esters, nitriles and amides thereof such as acrylic acid, methyl acrylate, methyl methacrylate, acrylonitrile, methacrylonitrile and methacrylamide; vinyl pyridines such as 2-vinyl pyridine and 2-methyl-5-vinyl pyridine; methylvinyl ketones; and vinylidene chloride.

The acrylic resins which are usable in the present invention include polymers of acrylic compounds such as methyl acrylate, ethyl acrylate, butyl acrylate, 2-ethylhexyl acrylate, acrylic acid, glycidyl acrylate, 2-hydroxyethyl acrylate, hydroxypropyl acrylate, methyl methacrylate, ethyl methacrylate, butyl methacrylate, methacrylic acid, glycidyl methacrylate, 2-hydroxyethyl methacrylate, dimethyl aminoethyl methacrylate, hydroxypropyl methacrylate and ethylene glycol dimethacrylate and copolymers thereof, as well as copolymers formed between at least one of said acrylic compounds and at least one other copolymerizable ethylenic derivative. Examples of said copolymerizable ethylenic derivative include vinyl acetate, styrene, acrylonitrile, butadiene and methylvinyl ketone.

The vinylidene chloride resins which are usable in the present invention include polymers of vinylidene chloride and copolymers formed between vinylidene chloride and at least one other copolymerizable monomer such as, for example, an ethylenic derivative monomer. Specific examples of said ethylenic derivative include methacrylic acid, maleic acid, fumaric acid, itaconic acid, acrylic acid, acrylonitrile, methyl acrylate, ethyl acrylate, butyl acrylate, methyl methacrylate, vinyl acetate, vinyl chloride and 2-ethylhexyl acrylate.

The ethylenic resins which are usable in the present invention are polyethylene and copolymers formed between ethylene and at least one other copolymerizable monomer. Examples of such other copolymerizable monomers include vinyl acetate, vinyl chloride, styrene, ethyl acrylate, propylene and metal (e.g. sodium and potassium) salts of acrylic acid. Ethylene-vinyl acetate is preferable.

The vinyl acetate resins which are usable in the present invention include polymers of vinyl acetate and copolymers formed between vinyl acetate and at least one copolymerizable monomer. Specific examples of such copolymerizable monomers include methyl acrylate, ethyl acrylate, butyl acrylate, 2-ethylhexyl acrylate, glycidyl acrylate, 2-hydroxyethyl acrylate, hydroxypropyl acrylate, methyl methacrylate, ethyl methacrylate, butyl methacrylate, methacrylic acid, glycidyl methacrylate, 2-hydroxyethyl methacrylate, dimethylamino ethyl methacrylate, hydroxypropyl methacrylate, ethylene glycol dimethacrylate, styrene, ethylene, butadiene, maleic acid, fumaric acid, and fatty acid esters such as vinyl stearate and vinyl propionate.

In the present invention, the hydrophilic polymer serves to confer the affinity for the solvent in a paint, particularly for the paint with which the letters and figures are drawn on the resin plate, so that the produced resin plate enjoys excellent paintability free from the disadvantages such as uneven painting and runaway. Besides, it achieves an important role of a protective colloid, keeping the emulsion intact even after incorporation of a finely pulverized inorganic filler or other similar substance.

The hydrophilic polymers which are usable in the present invention include proteins such as casein, glue, gelatin and gluten; alginates such as ammonium alginate, potassium alginate and sodium alginate; hydrophilic polymers of vegetable origins such as gum arabic, tragacanth, karaya gum, pectinic acid and starch; acrylic acid type hydrophilic polymers such as polyammonium acrylate, polysodium acrylate and polyammonium methacrylate; polyvinyl alcohol; cellulosic derivatives such as carboxylated methyl cellulose, methyl cellulose, hydroxypropyl methyl cellulose, hydroxyethyl cellulose, cellulose xanthogenate and carboxylated starch.

In the present invention, the finely pulverized inorganic filler provides absorption and desiccation of paint and permits uniform deposition of the paint with which the letters and figures are drawn on the resin plate.

The finely pulverized inorganic filler to be used in the present invention is of a type extensively utilized for processing of resins. Specific examples include natural and synthetic fillers made preponderantly of clay, talc, titanium dioxide, calcium oxide, white carbon and other forms of calcium carbonate, silicates, magnesium carbonate, aluminum hydroxide, barium sulfate, calcium sulfate and carbon black or mixtures thereof which are in the form of particles of a particle diameter of not more than 30 microns. Use of a filler containing particles greater than 30 microns in diameter proves to be disadvantageous, because the coarse particles protrude from the upper surface of the surface layer on the resin plate so that, when the letters and figures are drawn on the resin plate, the protruding tips of the particles will cause uneven deposition of the paint on the resin plate.

In the present invention the isocyanate compound having at least two isocyanate groups serves to enhance the adhesive strength between the surface layer and the base resin plate to the extent of resisting peeling by scratches and to waterproof the surface layer, thereby making the resulting resin plate useful as a display destined for exposure to outdoor influences.

The isocyanate compounds having at least two isocyanate groups which are usable in the present invention are isocyanates containing two or more isocyanate groups in the molecular units thereof and those compounds which, upon exposure to external actions, liberate such isocyanates. Specific examples of isocyanate compounds preferably used in the present invention include isocyanate compounds such as hexamethylene diisocyanate, xylylene diisocyanate, tolylene diisocyanate and diphenyl methane diisocyanate; polyisocyanates obtained by the polymerization of such isocyanate compounds; and reaction products of isocyanate containing unaltered isocyanate functional groups. Among then, tolylene diisocyanate is most preferred. For use in the present invention, the isocyanate compound is first dissolved in its hydrophobic solvent and mixed, in the form of the resultant solution, with the mixture of the other components. This procedure is for the purpose of furnishing the isocyanate groups with necessary protection and preventing the isocyanate groups from reacting with water. When the emulsion coating is applied to the resin plate and caused to dry thereon, the isocyanate compound in the applied emulsion coating begins to react after said solvent has been expelled through vaporization.

The solvent which is used advantageously for this purpose is selected from the group consisting of aromatic hydrocarbon solvents, halogenated hydrocarbon solvents, hydrocarbon solvents, ketone solvents, aliphatic solvents and ester solvents such as ethyl acetate, toluene, benzene, xylene, methylethyl ketone and methylisobutyl ketone.

The styrenic resin plates which are usable in the present invention are extruded plates and foamed plates composed of closed cells which are produced from homopolymers of styrene and α-methyl styrene and other similar styrene derivatives and copolymers thereof, as well as copolymers of styrene or styrene derivatives with other copolymerizable monomers such as styrene-methylmethacrylate copolymer, styrene-acrylonitrile copolymer, styrene-butadiene-acrylonitrile copolymer, methylmethacrylate-butadiene-styrene copolymer and α-methylstyrene-methyl methacrylate copolymer. The styrenic resin plates which are used advantageously for the present invention are those obtained by foaming. The foamed plates of styrenic resins desired have a degree of foaming in the range of from 0.8 to 0.025 g/cm³ in terms of density. If the degree of foaming fails to reach the lower limit to 0.025 g/cm³, then the foamed plate has too coarse a surface to offer the desired paintability. In order to ensure clarity and uniformity of the paint with which the letters and figures have been drawn on the resin plate, it is more advantageous to have a surface layer of increased density formed on one side or both sides of the foamed sheet of styrenic resin.

In the present invention, the proportions of the components which compose the surface layer on the resin plate are so selected that, based on the combined amount of the hydrophobic synthetic resin and the hydrophilic polymer, the hydrophobic synthetic resin will account for 60 to 95 percent by weight and the hydrophilic polymer for 40 to 5 percent by weight. To 100 parts by weight of the combined amount of the hydrophobic synthetic resin and the hydrophilic polymer, the finely pulverized inorganic filler is added in an amount of from 30 to 500 parts by weight and the isocyanate compound having at least two isocyanate groups in an amount of from 2 to 15 parts by weight. The hydrophobic solvent for the isocyanate compound is preferably added in an amount one to five times as large as that of the isocyanate compound. In terms of the amount of surface layer formed after the water or water and solvent have been expelled, the amount of coating of the emulsion coating preferably weighs 20 g/m² to 300 g/m².

If the proportion of the hydrophobic synthetic resin fails to reach the lower limit of 60 percent by weight, then the produced surface layer offers deficient tenacity and little durability and yields readily to peeling. If the proportion of the hydrophobic synthetic resin exceeds the upper limit 95 percent by weight, then the proportion of the hydrophilic polymer becomes so small that the produced surface layer fails to exhibit excellent paintability owing to its lack of affinity, i.e., the capacity for absorbing and uniformly dispersing the paint used in drawing letters and figures on the resin plate. If the proportion of the finely pulverized inorganic filler fails to reach the lower limit of 30 parts by weight, the resulting surface layer suffers runaway of the paint applied thereto or uneven painting. If it exceeds the upper limit of 500 parts by weight, the resulting surface layer becomes brittle and lacks strength and durability. If the proportion of the isocyanate compound fails to reach the lower limit of 2 parts by weight, then the incorporated isocyanate compound fails to provide its expected contribution of enhancing the degree of adhesion between the surface layer and the base resin plate. If it exceeds the upper limit of 15 parts by weight, then the expected dispersion of the isocyanate compound solution in the solvent into water is lowered because the reaction of said isocyanate compound with water is promoted, with the result that the emulsion is destroyed and the pot life of the solution is shortened. The amount of the solvent for the isocyanate compound is desired to be selected from the range of from one to five times the amount of said isocyanate compound. If it fails to reach the lower limit of equal to the amount of the isocyanate compound, the solvent does not bring about the expected effect of addition. If it exceeds the upper limit of five times, however, the rate at which this solvent is evaporated becomes lower than the rate at which the applied emulsion coating is dried, with the result that part of the solvent remains to become a residual solvent and corrodes the styrenic resin plate to the extent of degrading the strength of said resin plate. If the resulting surface layer weighs less than 20 g/m², then the affinity necessary for the absorption of the applied paint for drawing of letters and figures is not obtained. Consequently, the effect of the present invention is not manifested. If it weighs more than 300 g/m², then the resulting surface layer has excellent paintability, but such product is expensive and necessitates a long period of time for the production thereof.

In the practice of the present invention, especially preferred emulsion coatings comprise, based on the combined amount of the hydrophobic synthetic resin and the hydrophilic polymer, from 10 to 30 percent by weight of polyvinyl alcohol, from 10 to 30 percent by weight of styrene-butadiene rubber, from 80 to 40 percent by weight of vinyl acetate copolymer and from 2 to 15 percent by weight of isocyanate compound.

In the practice of the present invention, the emulsion coating can be prepared by mixing the hydrophobic synthetic resin, the hydrophilic polymer, the finely pulverized inorganic filler and water and pigment, flame-retardant, etc. in any sequence. Of course, the emulsion coating can be prepared by using an aqueous emulsion of the hydrophobic synthetic resin, an aqueous solution or dispersion of the hydrophilic polymer or an aqueous dispersion of the finely pulverized inorganic filler. In this case, it may not be necessary to add water separately. In case the emulsion coating comprises the isocyanate compound, the emulsion coating can be prepared by adding a solution of the isocyanate compound in a hydrophobic solvent to the mixture comprising the hydrophobic synthetic resin, the hydrophilic polymer, the finely pulverized inorganic filler and water prepared as above.

In the practice of the present invention, the emulsion coating can be applied onto the surface of the styrenic resin plate by a known coating technique such as roll coater, spray coater or brushing coater.

The styrenic resin plate which is obtained by the present invention is such that when letters and figures are drawn thereon by use of an aqueous or solvent-type paint, the applied paint is free from the phenomena of uneven painting and runaway and the resulting surface coat enjoys strong adhesion sufficient to resist peeling due to scratch and friction. The surface layer is held so fast that it will not come off when it is wetted with drops of water and then scratched. When the painted surface layer is left to stand in the sun light for a long time, the paint applied to said surface layer neither develops cracks and injuries nor yields readily to peeling. The resin plate according to the present invention enjoys flame-retardancy as well as freedom from warping and excels in ink-acceptability and paintability.

In the following examples, a part is by weight and viscosity is measured by Brookfield-type viscometer.

EXAMPLE 1

138 Parts of ethylene-vinyl acetate copolymer emulsion (Sumikaflex 500; solids content 55%, pH 4.5–6.5, viscosity 200–700 cps at 25° C.), 102 parts of a 23.6 weight percent methyl cellulose (Dow Chemical's Methocel CHG 2000 cp grade) aqueous solution and 440 parts of finely powdered natural talc (commercially available under trade name of Mistron Vapor, formed of flake-shaped particles 0.8 to 3 microns in size, pH 9–9.5) were uniformly mixed, with precautions exercised to avoid causing precipitation and gelation. To the resultant mixture was added 16 parts of a pigment (commercially available under trade name Fastogen Super Red 2Y), then a solution having 6.7 parts of polyisocyanate containing a polymer of hexamethylene diisocyanate (Coronate HL made by Nippon Polyurethane; solids content 74–76%, viscosity below Gardener W, -NCO content 12–13%) dissolved in 20 parts of methylethyl ketone and finally 10 parts of a flame-retardant (commercially available perchloropentacyclodecane in the form of white powder, melting point 485° C., specific gravity 2.02, molecular weight 545.6, chlorine content 78.3%). The mixture was blended to produce an emulsion coating. This emulsion coating was applied with a metallic roll coater to one side of an impact-resistant plate of styrene copolymer (Styron 475S board, 2 mm in thickness). The plate with the applied emulsion coating was dried in a hot air circulation drier at 90° C. for 15 seconds. Consequently, there was produced a resin plate possessing a surface layer weighing 80 g/m$^2$. The degree of adhesion between the surface layer and the base resin plate was such as to resist scratches made by the tip of finger nails. When a picking peel was tried by imparting cross cuts (in sections of 2 mm intervals) on the surface layer with a knife, pressing an adhesive cellophane tape (Nichiban) 18 mm in width on the cut surface and peeling the tape off the surface, the peeling was less than 5 percent. When the plate was subjected to a flammability test in accordance with the method specified by JIS A9511, it was found acceptable. This plate was not discolored by the sunlight and emitted no odor.

On the surface layer side of this resin plate, letters and figures were drawn with various poster colors, aqueous paints and Chinese writing ink. The letters and figures could be drawn without entailing uneven painting and runaway. The resin plate containing these letters and figures was left to stand in a window exposed to sunlight for three months in spring. The painting materials in said letters and figures on the resin plate did not yield to swelling, cracking and peeling and manifested their effects to a full extent. Excelling in ink-acceptability and paintability as described above, this plate proved to be highly valuable from a practical point of view.

EXAMPLE 2

Into a mixer, 50 parts of water was placed. 330 parts of white carbon of synthetic silicate (commercially available under trade name of Nipsil VN3, powder of spherical particles about 0.016 microns in diameter, pH 5.8–6.8) and 4 parts of 10 weight percent sodium hexametaphosphate aqueous solution as a dispersant were simultaneously added to said water. While the water and the added components were agitated, 5 parts of a pigment (commercially available Fastogen Blue GP-100) was gradually added and thoroughly dispersed therein. Then, 127 parts of polyammonium acrylate solution (Primal G-110 made by Rohm and Haas Company, viscosity 170 cps, solids content 22 percent) was gradually added and uniformly agitated therein. The resultant mixture was uniformly agitated with 144 parts of butyl acrylate emulsion (commercially available under trade name of Aron A-1001, solids content 50 percent, pH 6–8, viscosity 200–400 cps at 30° C.). Then, a solution of 8 parts of xylene diisocyanate (commercially available under trade name of Takenate 500, molecular weight 188.19, boiling point 151° C./6 mmHg, viscosity 3.6 cps at 20° C., density 1.2 g/cm$^3$, surface tension 37.4 dynes/cm$^2$) in 25 parts of ethyl acetate was gradually added and uniformly dispersed in said agitated mixture to produce an emulsion coating. This emulsion coating was applied to both sides of a foamed plate of polystyrene (Woodlack B-C nonflammable grade, 14 mm in thickness, degree of foaming 16 times, surface layer 0.1 to 0.5 mm) with a blade roll coater to produce a plate containing a surface layer on both sides. When an aqueous paint (commercially available under trade name of Guitar paint) was diluted with water to 40 percent and the solution was applied in a fair thickness to the surface of the resin plate, the applied paint was free from the phenomena of uneven painting and runaway. The resin plate showed excellent light resistance and high durability as well as high adhesive property sufficient to defy the text of picking peel with cross cuts.

EXAMPLE 3

100 Parts of Neoprene emulsion (Showa Neoprene 842A, solids content 50 percent, pH 12, specific gravity 1.10, viscosity 39 cps at 23° C.) and 175 parts of 20 percent by weight of polyvinyl alcohol (Kuraray Poval PVA-117) aqueous solution were mixed. To the mixture 450 parts of commercially available clay were added and mixed, with precautions exercised not to cause precipitation and gelation. To the resultant mixture was then added 12 parts of a pigment (Dainippon Ink Carmin 6B-220) and then a solution resulting from addition of 7 parts of tolylene diisocyanate to 28 parts of toluene. The emulsion coating consequently obtained was applied to both sides of a foamed plate of polystyrene resin (Woodlack B-W made by Asahi-Dow Limited) with a roll coater and dried in a hot air circulation drier. When letters and figures were drawn with poster colors and paints on this resin plate, they could be drawn uniformly without entailing the phenomena of uneven painting and runaway. When the resin plate containing said letters and figures was left to stand in a sunny place for one month, the painting materials in said letters and figures on the surface did not yield to peeling and cracking. Thus, the plate proved to excel in ink-acceptability and paintability.

EXAMPLE 4

One hundred parts by weight of an ethylene-vinyl acetate copolymer emulsion (Sumikaflex 500: solid components 55%, pH 5, viscosity 4000 cps at 25° C.), 25 parts by weight of an acrylate emulsion (Aron A-1001: solid components 50% pH 6.5, viscosity 300 cps at 30° C.), 600 parts by weight of a polyvinyl alcohol solution (Kuraray poval PVA-H: solid components 5%, saponification degree 99.9%) and 350 parts by weight of finely pulverized talc (commercially available Mystron Vapor: shaped in flakes with sizes of 0.8 to 3 microns, pH 9) were mixed homogeneously without formation of precipitation or gelation. To this mixture were added 15 parts by weight of a pigment (Fastongen Super Red ZY) and further a solution of 6 parts by weight of a polyisocyanate containing hexamethylene diisocyanate polymer (Coronate HL, produced by Nippon Polyurethane Co.: solid component 75%; viscosity Gardner W or lower; —NCO content: 12%) dissolved in 20 parts by weight of methyl ethyl ketone. The resultant emulsion coating material was coated on one surface of a high impact styrene copolymer plate (Styron 475S board, 2 mm in thickness) by means of a metalline bar roll coater and dried at 90° C. in a hot air circulation drier for 15 seconds to obtain a board having a surface layer of 70 g/m$^2$. On the side of this surface layer were applied various postor colors, aqueous paints and Chinese ink by way of painting or writing. The letters and figures could be drawn without entailing uneven painting and runaway. The adhesion strength of the skin layer on the substrate plate was strong enough to resist scratches by the tip of finger nails. When a picking peel was tried by imparting cross cuts in sections of 2 mm intervals on the surface layer with a knife, pressing an adhesive cellophane tape (Nichiban: trade mark) 18 mm in width on the cut surface and peeling the tape off the surface, the peeling was less than 5 percent. Further, when the coated plate is exposed to sunlight for three months, the plate surface is free from swelling and cracking to prove to be a plate excellent in ink-acceptability and paintability which is very valuable in practical application.

EXAMPLE 5

An emulsion coating was prepared by uniformly mixing 98 parts of white carbon of silicon dioxide (commercially available under trade name of Aerosol, particle diameter 0.01–0.04 micron, pH 3.6–4.2) and 130 parts of calcium carbonate (commercially available under trade name of Whiton SB, amorphous powder of particles 0.5–3.6 microns in diameter, pH 8–9) with 100 parts of an aqueous 20 weight percent completely saponified polyvinyl alcohol (commercially available under trade name of Kuraray PVA-H, volatile content 5%, degree of saponification 99.9 percent, viscosity 25 cps at 20° C. in 4 percent aqueous solution) solution and having the resultant mixture uniformly agitated with 33 parts of an uncarboxylated styrene-butadiene copolymer emulsion (Japanese Geon Nipol LX206, solids content 45.5 weight percent, specific gravity 0.99, viscosity 20 cps at 25° C.), 108 parts of chloroprene polymer emulsion (Denka chloroprene latex LM-60, solids content 60 percent, pH more than 10, latex specific gravity 1.14, Viscosity 200–400 cps at 23° C., surface tension 33 dynes/cm$^2$) and 8 parts of a pigment (commercially available under trade name of Chrome Yellow G) in a mixer. Immediately prior to application, this emulsion was uniformly agitated with a solution having 12 parts of an isocyanate type compound (Nippon Polyurethane's Coronate L, 75 percent solution in ethyl acetate, —NCO content 13 percent, specific gravity 1.17 g/ml, viscosity 1500–2500 cps at 20° C.) dissolved in 25 parts of ethyl acetate. The resultant emulsion coating was applied by a spray on one side of a foamed plate of polystyrene (Asahi-Dow's Woodlack B panel grade, degree of foaming 8 times, thickness 9 mm, area 1080 cm × 740 cm, with surface layer) and dried in a hot air circulation drier at 85° C. for 20 seconds, to produce a resin plate possessing a surface layer weighing 120 g/m$^2$. This plate could readily be punched to varying shapes. For use as displays and advertizing plates, this plate proved highly advantageous over the countertype made of paper, for it was much less flammable and more readily workable. When letters and figures were drawn with a solvent-type paint, the plate was free from the drawback of poor resistance to solvent suffered by ordinary polystyrene foam. The plate showed the letters and figures with high clarity and provided high affinity for the paint. The paint in the letters and figures on the surface was free from the phenomena of peeling. This freedom from said underisable phenomena was also shown when letters and figures were drawn with aqueous paints such as poster colors. When a picking peel test was performed on the applied paint on the surface for the purpose of determining adhesiveness of paint, no peeling was observed in the paint and on the surface layer. When the same plate was subjected to a sunlight exposure test (4 months' standing in a window), the surface layer showed no discoloration. In a picking peel test performed by heating the plate at 60° C. for 24 hours, imparting on the surface cross cuts at intervals of 2 mm with a knife, pressing a cellophane adhesive tape (Nichiban) to the cut surface and peeling the tape off the surface, the peeling could be less than 4 percent. No peeling was observed when the plate was wetted with drops of water and then touched by the tip of fingers. The plate, thus, enjoyed durability and excellent ink-acceptability and paintability.

EXAMPLES 6–20:

Emulsion coatings were prepared by uniformly mixing a polyvinyl alcohol (Kuraray Poval PVA-117), an uncarboxylated styrene-butadiene copolymer emulsion (the same as described in the example 5), ethylene-vinyl acetate copolymer emulsion (the same as described in the Example 1), a finely powdered natural talc (the same as described in the Example 1) and water. In some examples, a solution of 8 parts by weight of xylene diisocyanate (the same as described in the Example 2) in 25 parts by weight of ethyl acetate was gradually added and uniformly dispersed in said mixture to produce an emulsion coating. The composition of the emulsion coatings were as indicated in the following table.

The emulsion coatings were applied to one side of an impact-resistant plate of styrene copolymer (Styron 475 S board, 2 mm in thickness) and the degree of adhesion between the surface layer and the base resin plate was determined using the same procedure as described in Example 1. The water-resisting adhesiveness was also determined using the same procedure as described in Example 4. The results were as indicated in the following table.

On the surface layer side of the resin plate, letters and figures were drawn with poster color (commercially available under trade name of Guitar paint). The paintabilities were as indicated in the following table.

| Example No. | 6 | 7 | 8 | 9 | 10 | 11 | 12 | 13 | 14 | 154 | 16 | 17 | 18 | 19 | 20 |
| --- | --- | --- | --- | --- | --- | --- | --- | --- | --- | --- | --- | --- | --- | --- | --- |
| Composition (part) | | | | | | | | | | | | | | | |
| polyvinyl alcohol | 10 | 15 | 15 | 15 | 20 | 30 | 5 | 10 | 15 | 15 | 30 | — | 100 | — | — |
| styrene-butadiene copolymer | 16 | 15 | 20 | 40 | 14 | 12 | 17 | 16 | 10 | 60 | 12 | 18 | — | 100 | — |
| ethylene-vinyl acetate copolymer | 74 | 70 | 65 | 45 | 66 | 58 | 78 | 74 | 75 | 25 | 58 | 82 | — | — | 100 |
| talc | 396 | 396 | 396 | 396 | 396 | 396 | 396 | 396 | 396 | 396 | 396 | 396 | 396 | 396 | 396 |
| water | 228 | 228 | 228 | 228 | 228 | 228 | 228 | 228 | 228 | 228 | 228 | 228 | 228 | 228 | 228 |
| xylene diisocyanate | — | — | — | — | — | — | 8 | 8 | 8 | 8 | 8 | — | — | — | — |
| Degree of adhesion | | | | | | | | | | | | | | | |
| dry | 5 | 5 | 5 | 3 | 3 | 3 | 5 | 5 | 5 | 5 | 5 | 5 | 1 | 3 | 5 |
| water-resistance | 3 | 3 | 3 | 3 | 2 | 2 | 4 | 5 | 5 | 3 | 4 | 5 | 1 | 2 | 4 |
| paintability or ink-acceptability | | | | | | | | | | | | | | | |
| uneven painting | A | A | A | B | A | A | B | A | A | A | A | C | A | C | C |
| cracking | A | A | A | A | A | A | B | A | A | A | B | B | A | A | C |

| Example No. | 6 | 7 | 8 | 9 | 10 | 11 | 12 | 13 | 14 | 154 | 16 | 17 | 18 | 19 | 20 |
|---|---|---|---|---|---|---|---|---|---|---|---|---|---|---|---|
| adhesive | 4 | 4 | 3 | 3 | 3 | 3 | 4 | 5 | 5 | 4 | 4 | 2 | 1 | 2 | 2 |

In the above table,
adhesive:
5: peeling less than 5%
4: " 20%
3: " 40%
2: " 60%
1: " 100%
uneven painting (gross investigation):
A: even painting
B: partially uneven painting
C: uneven painting
cracking (gross investigation):
A: substantially no cracking
B: partial cracking
C: overall cracking Chloroprene polymer or copolymer and styrene-butadiene copolymer are preferable as the butadiene resin.

What we claim is:

1. A styrenic resin plate excellent in ink-acceptability and paintability comprising a styrenic resin substrate having coated on one surface or both surfaces thereof a layer with a composition comprising 100 parts by weight of a resin mixture consisting of 60 to 95% by weight of a hydrophobic synthetic resin and 40 to 5% by weight of a hydrophilic synthetic resin, 30 to 500 parts by weight of a finely pulverized inorganic filler and 2 to 15 parts by weight of an isocyanate compound having at least two isocyanate groups.

2. A styrenic resin plate excellent in ink-acceptability and paintability according to claim 1, wherein the mixture contains at least one of a pigment and a flame-retardant additionally incorporated therein.

3. A styrenic resin plate excellent in ink-acceptability and paintability according to claim 1, wherein the hydrophilic polymer is polyvinyl alcohol.

4. A styrenic resin plate excellent in ink-acceptability and paintability according to claim 1, wherein the isocyanate compound is tolylene diisocyanate.

5. A styrenic resin plate excellent in ink-acceptability and paintability according to claim 1, wherein the hydrophobic synthetic resin is chloroprene polymer or copolymer.

6. A styrenic resin plate excellent in ink-acceptability and paintability according to claim 1, wherein the hydrophobic synthetic resin is ethylene-vinyl acetate resin.

7. A styrenic resin plate excellent in ink-acceptability and paintability according to claim 1, wherein the hydrophobic synthetic resin is a mixture of styrene-butadiene copolymer and ethylene-vinyl acetate copolymer.

8. A styrenic resin plate excellent in ink-acceptability and paintability according to claim 1, wherein the hydrophobic synthetic resin is a mixture of an ethylene-vinyl acetate copolymer resin and an acrylate resin.

* * * * *